(12) United States Patent
Takenaka (10) Patent No.: US 7,440,594 B2
(45) Date of Patent: Oct. 21, 2008

(54) FACE IDENTIFICATION DEVICE AND FACE IDENTIFICATION METHOD

(75) Inventor: Hideki Takenaka, Shiga (JP)

(73) Assignee: Omron Corporation, Kyoto (JP)

( * ) Notice: Subject to any disclaimer, the term of this patent is extended or adjusted under 35 U.S.C. 154(b) by 716 days.

(21) Appl. No.: 10/628,228

(22) Filed: Jul. 29, 2003

(65) Prior Publication Data

US 2004/0081338 A1 Apr. 29, 2004

(30) Foreign Application Priority Data

Jul. 30, 2002 (JP) ............................. 2002-220655

(51) Int. Cl.
*G06K 9/00* (2006.01)

(52) U.S. Cl. ...................................... 382/118
(58) Field of Classification Search ........................ None
See application file for complete search history.

(56) References Cited

U.S. PATENT DOCUMENTS

| 5,164,992 | A | * | 11/1992 | Turk et al. ................... 382/118 |
| 5,771,307 | A | * | 6/1998 | Lu et al. ...................... 382/116 |
| 6,496,594 | B1 | * | 12/2002 | Prokoski ...................... 382/118 |
| 2004/0145657 | A1 | * | 7/2004 | Yamamoto et al. .......... 348/143 |

FOREIGN PATENT DOCUMENTS

| JP | 10-165490 | 1/2000 |
| JP | 11-263092 | 3/2001 |
| JP | 2001-086407 A | 3/2001 |
| JP | 2002-150441 A | 5/2002 |

OTHER PUBLICATIONS

Suriyon, et al., "Concealment of A Person Using Face Recognition in Situation Video Image", (abstract only).

* cited by examiner

*Primary Examiner*—Matthew C Bella
*Assistant Examiner*—Alex Liew
(74) *Attorney, Agent, or Firm*—Dickstein Shapiro LLP (57) ABSTRACT

The present invention is to protect the right of portrait or privacy of people other than a specific person, and to enable easy recognition of information other than the face of the specific person and the situation around the specific person. Images videotaped by the surveillance cameras are captured in the computer, face images are detected therefrom, and the detected face images are compared with the face image of a specific person registered in the storage device. As the results of the comparison, when these face images do not match with each other, a mosaic process is applied exclusively to the detected face images to protect the privacy of the people other than the specific person, whereas the mosaic process is not applied to the parts other than the faces, such as dress and baggage, thereby keeping them as they are. When these face images match with each other, the face image of the specific person is not applied with the mosaic process, thereby keeping his or her face and remaining parts as they are.

15 Claims, 9 Drawing Sheets

FACE IDENTIFICATION DEVICE AND FACE IDENTIFICATION METHOD

BACKGROUND OF THE INVENTION

1. Field of the Invention

The present invention relates to a face identification technique which detects human faces from images taken by a camera and compares them with a previously registered face, thereby detecting a specific person.

2. Description of the Prior Art

In order to search for a specific person like a criminal on a wanted list, a system is available that videotapes an unspecified number of the general public and records their images by installing surveillance cameras in airports, stations, shopping centers, busy streets, and the like. In this system, videotaped images are recorded as they are or face images are exclusively recorded by being extracted from the videotaped images. In these methods, there is a problem since the face images of the people other than the specific person are also recorded, failing to protect their rights of portrait or piracy.

Therefore, there is a system now available according to which the face image of a person videotaped by a surveillance camera is compared with the face image of the specific person registered: the face image of a videotaped person is recorded if these face images match with each other, whereas when these face images do not match with each other, the face image of the videotaped person is abandoned. In this system, out of the face images videotaped, those which do not match with the face image of the registered specific person are not kept, thereby securing protection of their privacy.

However, in the above-described system, what is recorded is only the face image matching with the face image of the specific person, and other useful information including the dress and baggage of the specific person and the situation around him or her are lost. As a result, when there is a match and a responsible official rushes to the display monitor by a report or when recorded images are confirmed later, the absence of information other than his or her face makes it difficult to search for the specific person.

On the other hand, in order to protect individuals' privacy, there is an approach of applying a mosaic process on face images as described in Japanese Laid-Open Patent Application No. 2001-86407. However, in this patent application, skin color is detected from videotaped human images and a mosaic process is automatically applied to face images, which forces all face images videotaped to be applied with a mosaic process, thereby making it impossible to apply a mosaic process to the face images excluding the face image of the specific person.

Japanese Laid-open Patent Application No. 2000-216 also discloses privacy protection measures by applying a mosaic process to human body images. However, when the technique of this patent application is used to protect the privacy of the people other than the specific person, it is difficult to check the situation around the specific person, because the whole image of the specific person is applied with the mosaic process.

SUMMARY OF THE INVENTION

The present invention, which is intended to solve the aforementioned problems, has the object of facilitating confirmation of information other than the face of a specific person and situation around the specific person, while protecting the right of portrait or privacy of the people other than the specific person.

A face identification device of the present invention comprises: detection means for detecting face images from human body images taken by a camera; storage means in which a face image of a specific person is previously stored; determination means for determining whether a face image detected by the detection means matches with the face image stored in the storage means by comparing both face images; and abstraction means for applying an abstraction process to a predetermined face image out of the face images detected by the detection means in order to make the predetermined face image unrecognizable. The abstraction means applies the abstraction process exclusively to a detected face image when the determination means determines that both face images do not match with each other. On the other hand, the abstraction means does not apply the abstraction process to a detected face image when the determination means determines that both face images match with each other.

A face identification method of the present invention comprises the steps of: detecting face images from human body images taken by a camera; determining whether a detected face image matches with the face image previously stored by comparing both face images; applying an abstraction process exclusively to a detected face image in order to make the detected face image unrecognizable, when it is determined that both face images do not match with each other; and not applying the abstraction process to the detected face image when it is determined that both face images match with each other.

The term "match" referred to in the above description means not only a complete match between a detected face image and the face image previously stored, but also a high degree of resemblance between these face images.

According to the present invention, when a detected face image and the registered face image do not match with each other, that is, when the detected face does not belong to the specific person, an abstraction process is applied on the face image in order to protect the right of portrait or privacy of the people other than the specific person. Furthermore, the abstraction process is applied only to the face images of the people, keeping images other than their faces, such as their dress and baggage. On the other hand, when a detected face image and the registered face image match with each other, that is, when the detected face belongs to the specific person, both the face image and images including the dress and baggage of the specific person are kept without being applied with the abstraction process. Thus keeping the images for the dress and baggage of a specific person and of the other people around as they are helps facilitate the search for the specific person by using these images as an important clue.

A typical example of the abstraction process in the present invention is a mosaic process. The use of the well-known mosaic process can abstract face images easily. Besides the mosaic process, various other methods are available for abstraction, such as blurring or filling in face image portions.

In the present invention, when it is determined that a detected face image matches with the stored face image, a marker is applied to the detected face image portion instead of applying an abstraction process thereto. The application of a marker makes a specific person distinguishable at a glance.

In the present invention, when it is determined that a detected face image matches with the stored face image, the image of the specific person applied with the abstraction process neither to his or her face nor remaining parts and the images of the other people applied with the abstraction process exclusively to their faces are displayed. At the same time, a warning is outputted. This system realizes a quick response because the warning is outputted at the time of the detection of a specific person. Concerning a specific person, the videotaped image is displayed as it is, and as for the people other than the specific person, the abstraction process is applied to their faces to protect their privacy while the images of their dress and baggage are displayed as they are. This makes it possible to obtain useful information about the specific person and the situation around him or her, thereby facilitating the search for the specific person.

DESCRIPTION OF THE PREFERRED EMBODIMENTS

Figure 1:
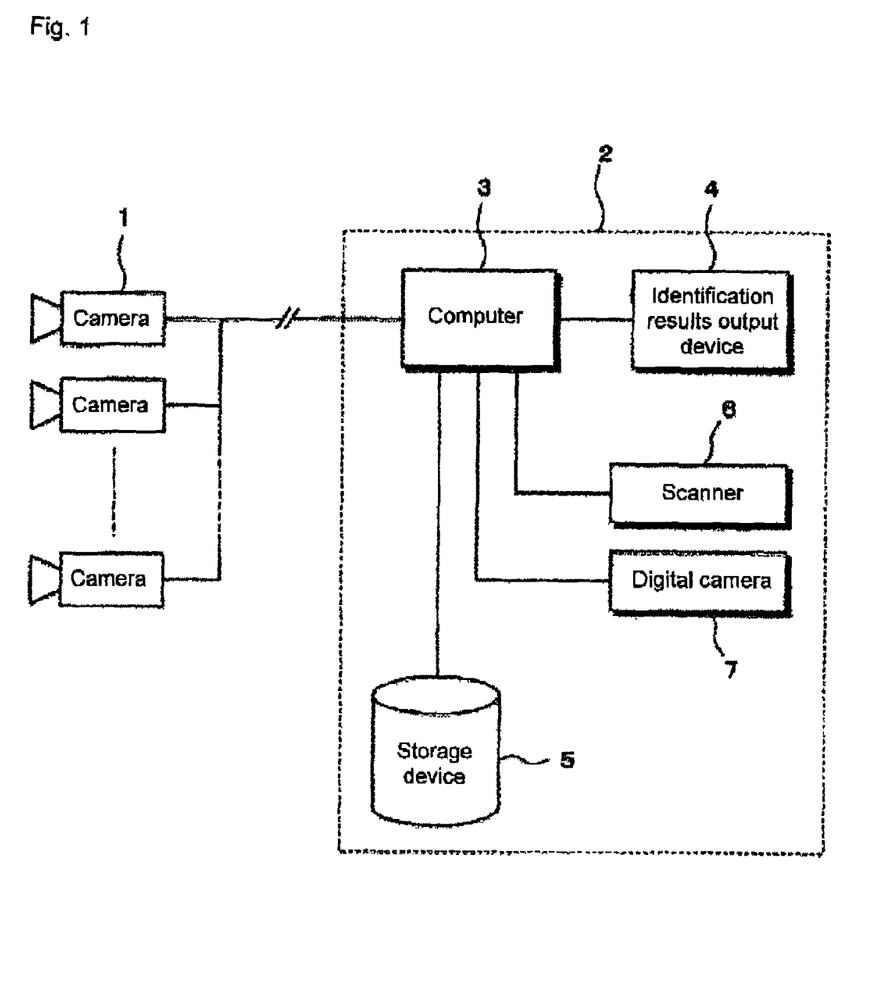
FIG. 1 shows a block diagram of the face identification system to which the present invention is applied.

FIG. 1 shows a block diagram of the face identification system to which the present invention is applied. In the drawing, the face identification system is composed of surveillance cameras 1 for videotaping the images of people, and the face identification device 2 of the present invention for identifying face images of the people videotaped by the surveillance cameras 1. A plurality of surveillance cameras 1 are installed in airports, stations, shopping centers, busy streets, and other places where a number of people gather, and each of the cameras 1 is connected with the face identification device 2 installed in a monitor center or the like.

In the face identification device 2, computer 3 is for face identification; reference numeral 4 is an identification results output device for outputting the results of face identification by the computer 3; and storage device 5 stores the face image data of a specific person (e.g., a suspect on the wanted list). Image input devices 6 and 7 are for registering a face image with the storage device 5. Input device 6 is a scanner, and input device 7 is a digital camera. The computer 3 includes detection means for detecting face images from images of people videotaped by the surveillance cameras 1; determination means for determining the presence or absence of a match between a detected face image and the face image stored in the storage device 5 by comparing them; and abstraction means for applying an abstraction process to a predetermined face image out of the detected face images out of the detected face images so as to make the face unrecognizable. The identification results output device 4 is composed of a display monitor for displaying identification results, and other output devices. The storage device 5 can be a hard disk or the like, which composes the storage means of the present invention. Besides a hard disk, an optical disk can be used as the storage means.

Figure 2:
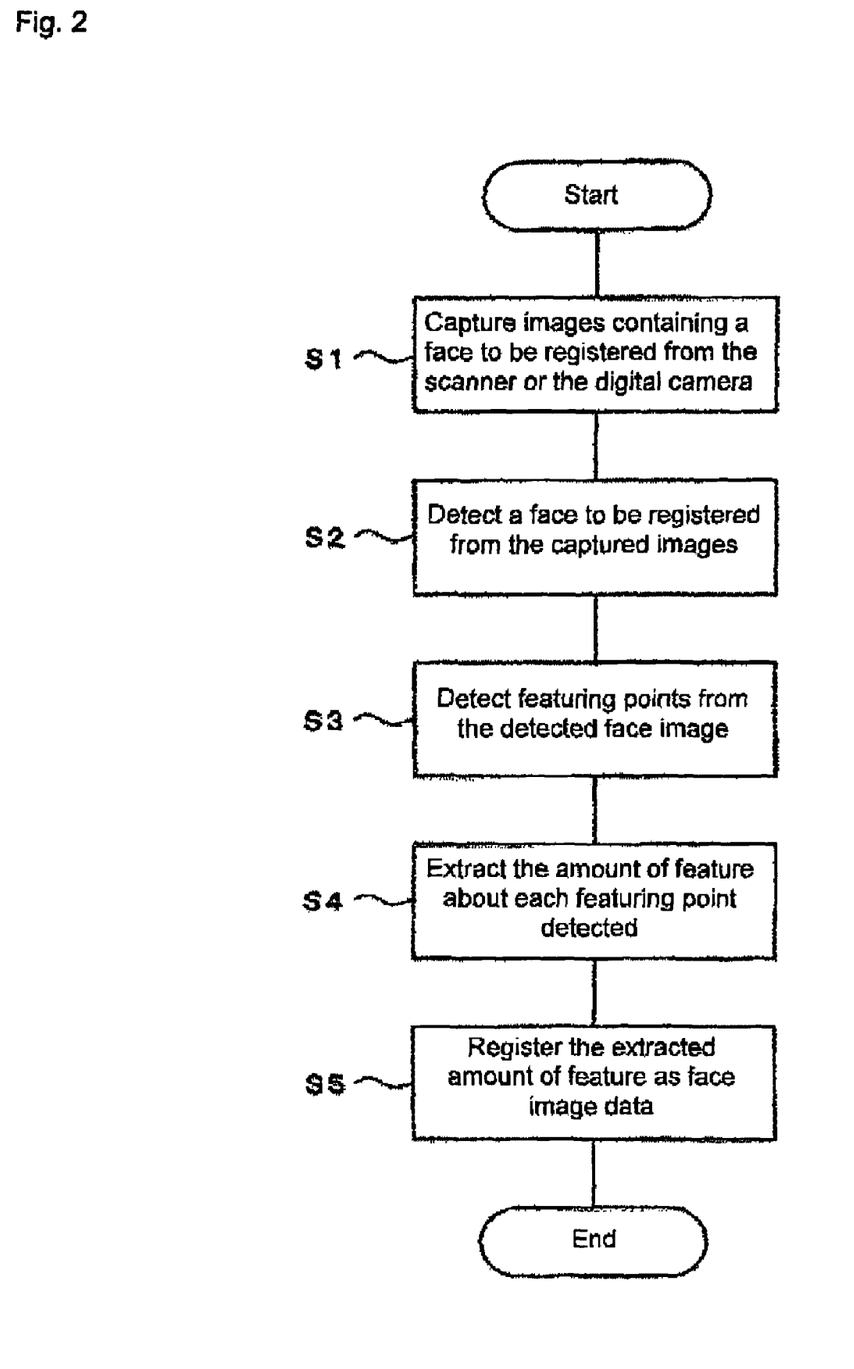
FIG. 2 shows a flowchart depicting the procedure for registering face images.

Operation of the face identification system having the above-explained structure will be described as follows. In this system, the face image of a specific person is previously registered in the storage device 5. FIG. 2 shows a flowchart depicting the procedure of face image registration, which is executed by the computer 3. At first, an image including the face of a specific person to be registered is captured into the computer 3 from the scanner 6 or the digital camera 7 (Step S1). Next, the face to be registered is detected from the captured image (Step S2). This face detection can be done by using a well-known approach, such as skin color detection, abstraction of difference with a background image, or abstraction of face likelihood from pattern matching, After the face detection, featuring points such as eyes, nose, mouth, and ears are detected from the face image (Step S3), and the amount of feature about the shape and position of each detected featuring point is extracted (Step S4). This abstraction of feature amount also can be done by using a well-known approach, such as extraction of the amount of feature from gray-scale images including eyes, nose, mouth, and ears by template matching. The amount of feature extracted is stored and registered in the storage device 5 as face image data (Step S5).

Figure 3:
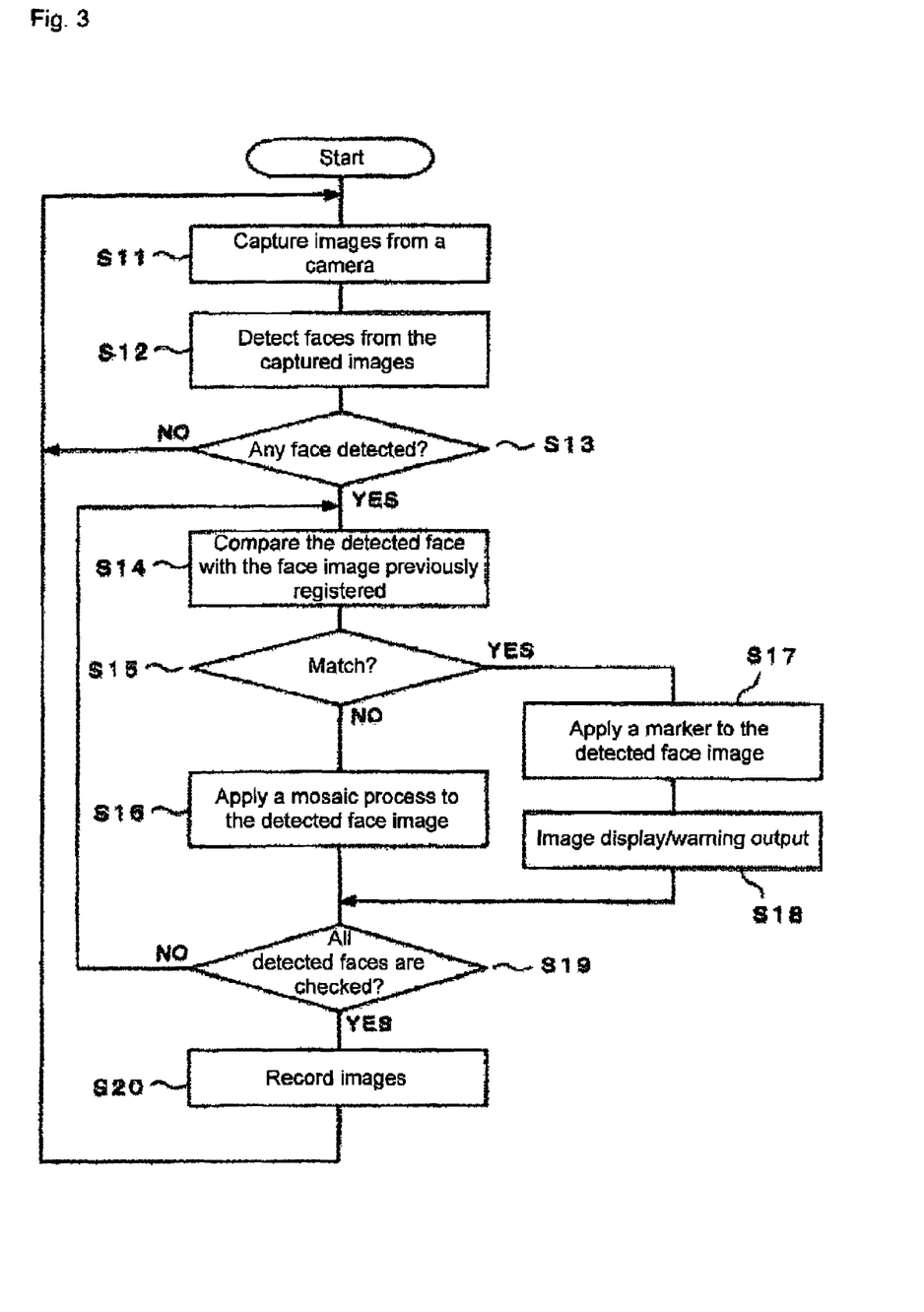
FIG. 3 shows a flowchart depicting the procedure of the face identification method of the present invention.

FIG. 3 shows a flowchart depicting the procedure of the face identification method of the present invention, the procedure being executed by the computer 3. In the computer 3, images videotaped by the surveillance cameras 1 are captured as still images at the interval of e.g. one second (Step S11), and human faces are detected from the captured images (Step S12). If there is no face detected (Step S13: NO), the process goes back to Step S11 and captures images in the next timing. If a face is detected (Step S13: YES), the detected face image is compared with the face image previously registered in the storage device 5 (Step S14) so as to determine whether or not these face images match with each other (Step S15).

Figure 4:
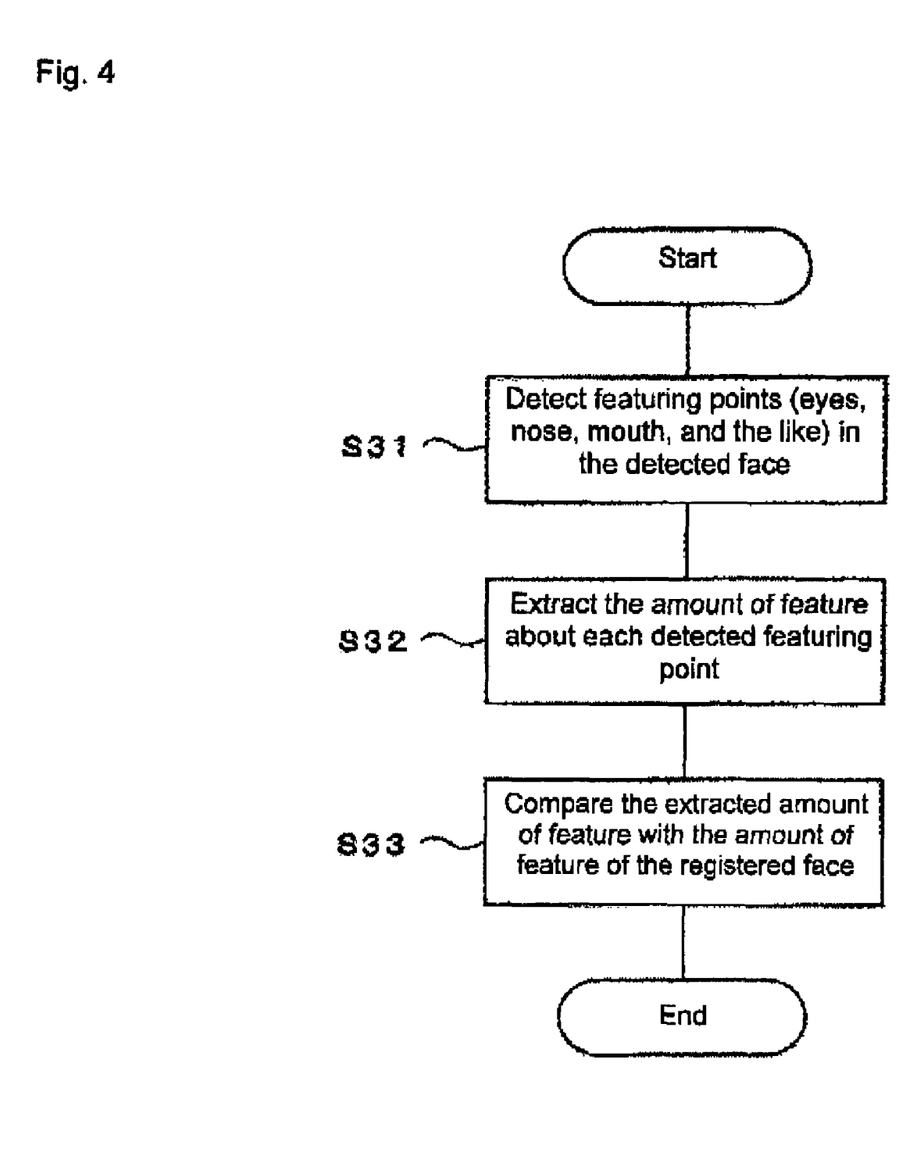
FIG. 4 shows a flowchart depicting a specific procedure of identification.

FIG. 4 shows a flowchart depicting the specific procedure of the comparison in Step S14. In the comparison, featuring points (eyes, nose, mouth, and the like) are detected from the detected face image (Step S31), and the amount of feature about the shape and position of each detected featuring point is extracted (Step S32). The extracted amount of feature is compared with the amount of feature of the face registered in the storage device 5 (Step S33). Based on the comparison results, it is determined whether these face images match with each other or not at Step S15 shown in FIG. 3. The term "match" referred to in this case means not only a complete match, but also a high degree of resemblance between these face images. To be more specific, the degree of resemblance is calculated from the amount of feature of each face image, and is compared with a predetermined threshold value. When the degree is equal to or over the threshold value, it is determined as a match.

Figure 5:
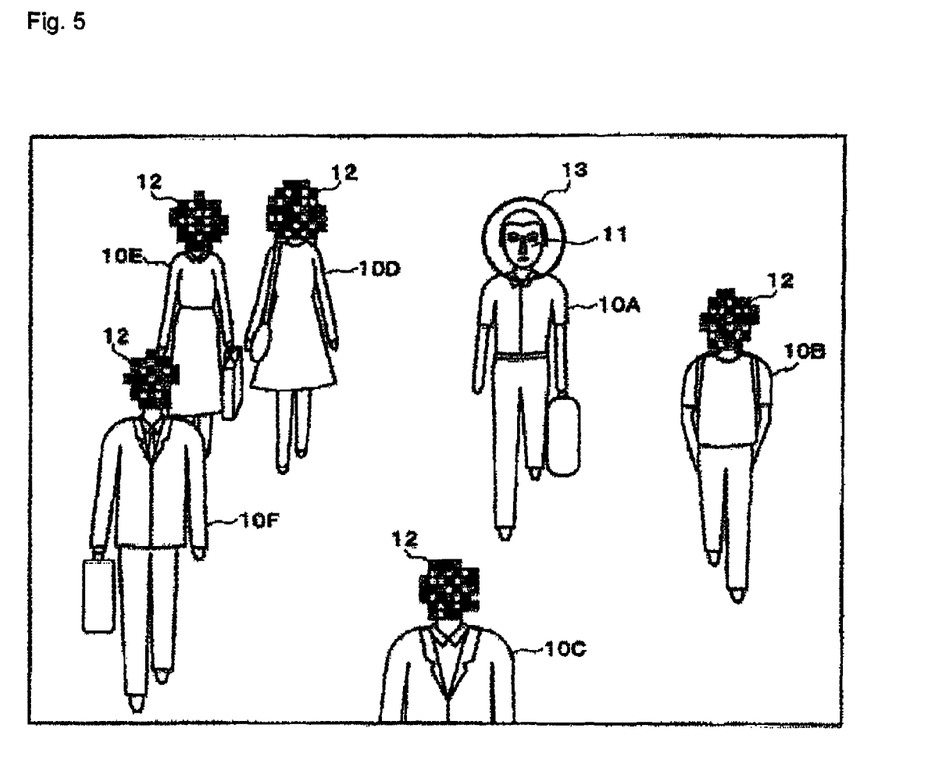
FIG. 5 shows an image example to which mosaic process has been applied.

As the results of the determination at Step S15, when a detected face image and the registered face image do not match with each other (Step S15:NO), the detected face image does not belong to the specific person registered. Therefore, the mosaic process is applied to the detected face image portion (Step S16). FIG. 5 shows an example of images to which the mosaic process has been applied The mosaic process 12 is applied to each face image of the persons 10B to 10F except the specific person so as to abstract their faces unrecognizably. The mosaic process 12 is applied exclusively to the face image portions, keeping dress and baggage portions unprocessed.

On the other hand, when a detected face image matches with the registered face image (Step S15:Yes), it means that the detected face image belongs to the registered specific person, so a marker 13 is applied to the detected face image portion instead of applying the mosaic process thereto (Step S17). In FIG. 5, the person 10A is the specific person, and the mosaic process 12 is not applied to the face image portion of the specific person 10A, thereby keeping the face 11 the same as when it is videotaped by the surveillance cameras 1. The face 11 is enclosed by the marker 13 to make the specific person distinguishable at a glance. The mosaic process 12 is not applied to the dress or baggage of the specific person 10A. In other words, concerning the specific person 10A, the image videotaped by the surveillance cameras 1 appears as it is.

After the process in Step S17, the identification results output device 4 displays, with a warning, the images shown in FIG. 5 including the image of the specific person 10A whose face and remaining parts are not applied with the mosaic process 12, and the images of the persons 10B to 10F whose faces are exclusively applied with the mosaic process (Step S18). This warning is displayed as a message including the name of the specific person, the time and date of the image videotaped, and the place videotaped. Furthermore, an alarm is issued as necessary with the display in order to draw the responsible official's attention. This enables the official to prepare the deployment of members for the search for the specific person.

Since the faces of the people other than the specific person 10A are applied with the mosaic process 12 as shown in FIG. 5, when the images are displayed on the display monitor, there is no fear of violating their rights of portrait or privacy. Furthermore, the mosaic process 12 is applied exclusively to their faces, keeping the remaining parts unprocessed, which enables easy recognition of the dress and baggage of the people around the specific person 10A. On the other hand, concerning the specific person 10A, the videotaped image of the whole body appears as it is, making it possible to confirm his dress and baggage in addition to his face. Thus, the mosaic process 12 is applied exclusively to face portions which raise the issue of privacy, and the remaining parts are kept the same as when they are videotaped, thereby facilitating the search for the specific person 10A by using the dress and baggage as a useful clue.

After Steps S16 to S18 are executed, it is determined whether matching is done for all the detected faces (Step S19). When there is still a face to be checked (S19: NO), the process goes back to Step S14 to check the next face. When all the detected faces have been checked (S19: YES), the image to which the procedure of Steps S16 and S17 has been applied is recorded to the storage device 5 (Step S20). Later, the process goes back to Step S11, and videotaped images are captured from the surveillance cameras 1 again in the next timing (in one second in this case). Hereafter, the procedure in Steps S12 to S20 is repeated.

The above example describes the case where images videotaped by the surveillance cameras 1 are captured as still images at the interval of one second; however, it is also possible to adopt a system which detects human faces from motion images videotaped by the surveillance cameras 1 and checks the faces while automatically chasing them. In this system, there is no need for the repeated recording of the image of the same person, which can reduce the amount of image data to be recorded in the storage device 5, thereby enabling miniaturization of the storage device 5.

Images stored in the storage device 5 can be outputted by being displayed or printed by the identification results output device 4 later at any point in time. In this case, too, the privacy of the people other than the specific person 10A is protected by applying the mosaic process to their faces, whereas the images for the dress and baggage including those of the specific person are stored as they are. This information can be used as a clue to facilitate the search for the specific person 10A.

In the aforementioned embodiment, the face image of a specific person is previously registered, and face images videotaped by surveillance cameras are compared with the registered face image so as to detect the specific person; however, it is also possible to detect a specific person registered afterwards by using images stored in the storage device 5. This system enables the detection of people whom the police have been requested to find or stray children.

Figure 6:
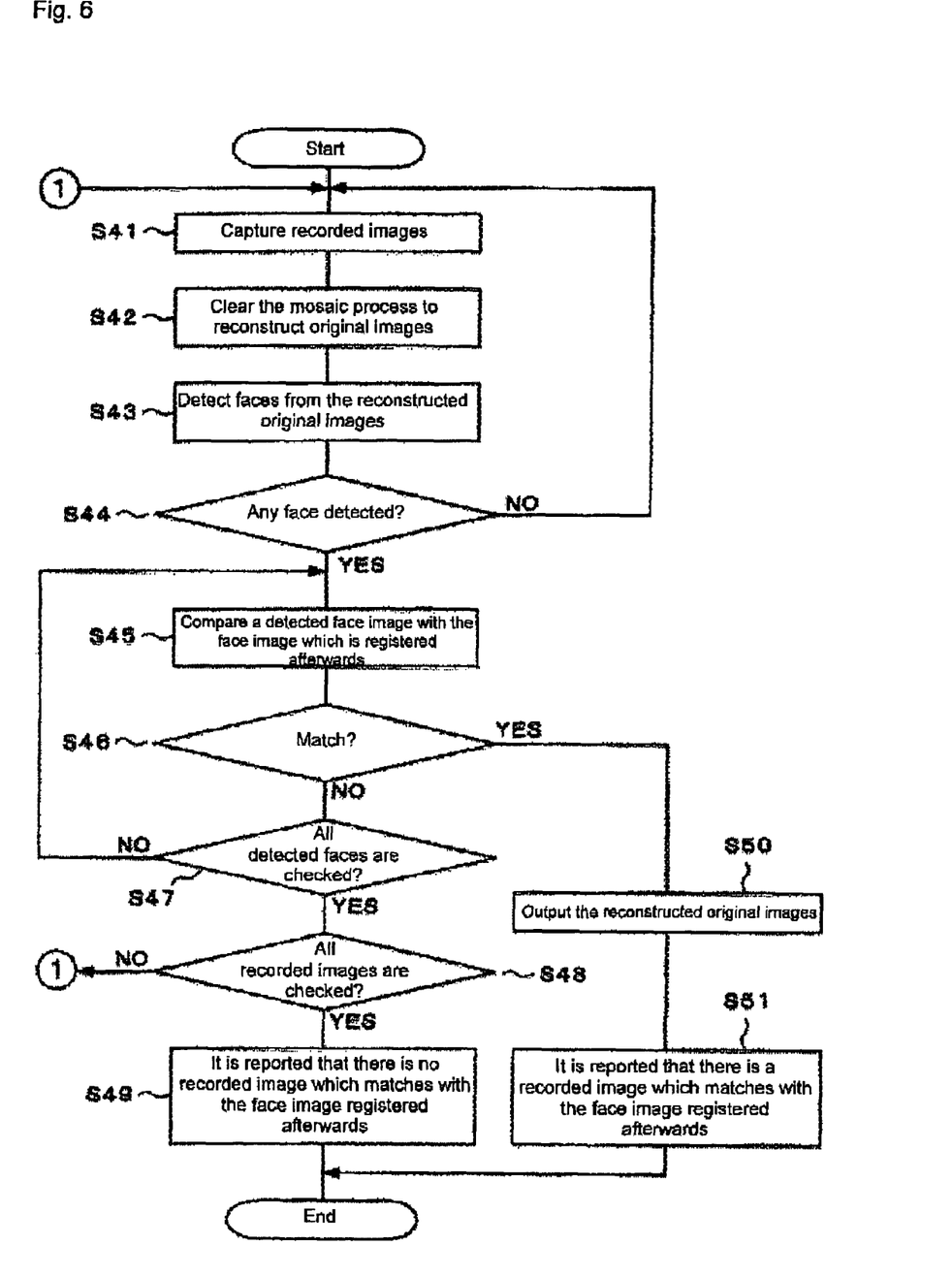
FIG. 6 shows a flowchart depicting the identification procedure in the case where a face image is registered afterwards.

FIG. 6 shows a flowchart depicting the procedure of identification in the case of registering afterwards as described above, the procedure being executed by the computer 3. At first, images stored in the storage device 5 are captured by the computer 3 (Step S41). The images stored in the storage device 5 are unrecognizable because of the above-described mosaic process, so it is necessary to reconstruct the original images for comparison. Therefore, the mosaic process is cleared to reconstruct the original images (Step S42). After the reconstruction of the original images, faces are detected from the reconstructed images (Step S43). If no face is detected from the reconstructed images (Step S44: NO), the process goes back to Step S41 to capture recorded images. On the other hand, if faces are detected from the reconstructed images (Step S44: YES), detected face images are compared with the face image which is registered afterwards (Step S45). The face image registered afterwards is taken by the scanner 6 or the digital camera 7 and recorded to the storage device 5 in the same manner as the previously registered case.

If the comparison results in Step S45 indicate that a recorded image face does not match with the face registered afterwards (Step S46: NO), it is determined whether all faces detected from the recorded images have been checked or not (Step S47). When there is a face left unchecked (Step S47: NO), the process goes back to Step S45 to check the next face. When all faces have been checked (Step S47: YES), it is determined whether all the recorded images have been checked or not (Step S48). If all recorded images are not checked (Step S48: NO), the process goes back to Step S41 to capture the next recorded image from the storage device 5 and the aforementioned procedure is repeated. When the comparison for all recorded images is complete (Step S48: YES), the absence of the face image matching with the face image registered afterwards is reported by being displayed on the display monitor of the identification results output device 4 (Step S49).

On the other hand, in Step S46, if a recorded face image matches with the face registered afterwards (Step S46: YES), the reconstructed original image is outputted to the identification results output device 4 and shown on the display monitor (Step S50). And it is reported by being shown on the display monitor that there is a recorded face image which matches with the face registered afterwards (Step S51).

Figure 7:
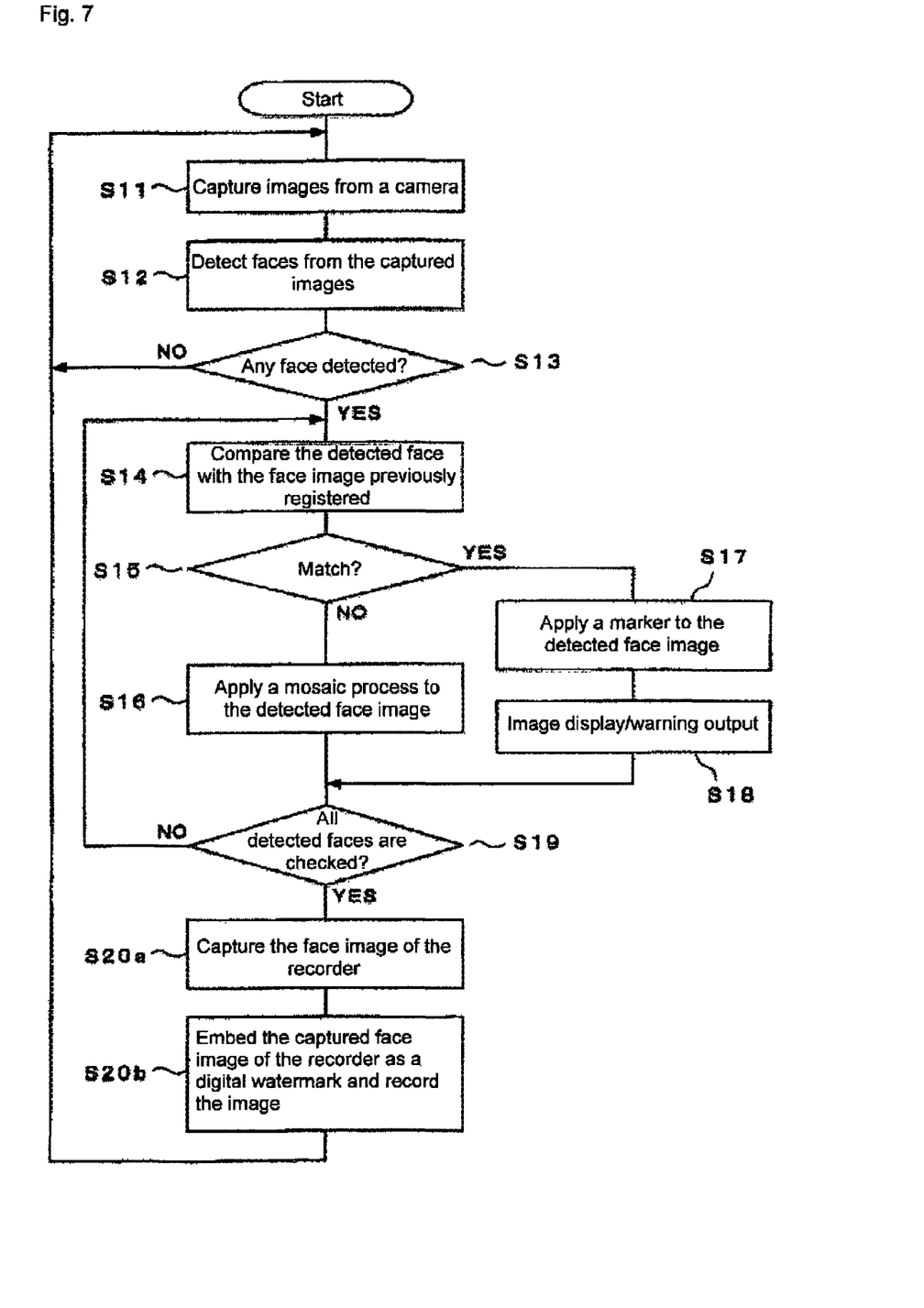
FIG. 7 shows a flowchart depicting another embodiment of the face identification method.
Figure 8:
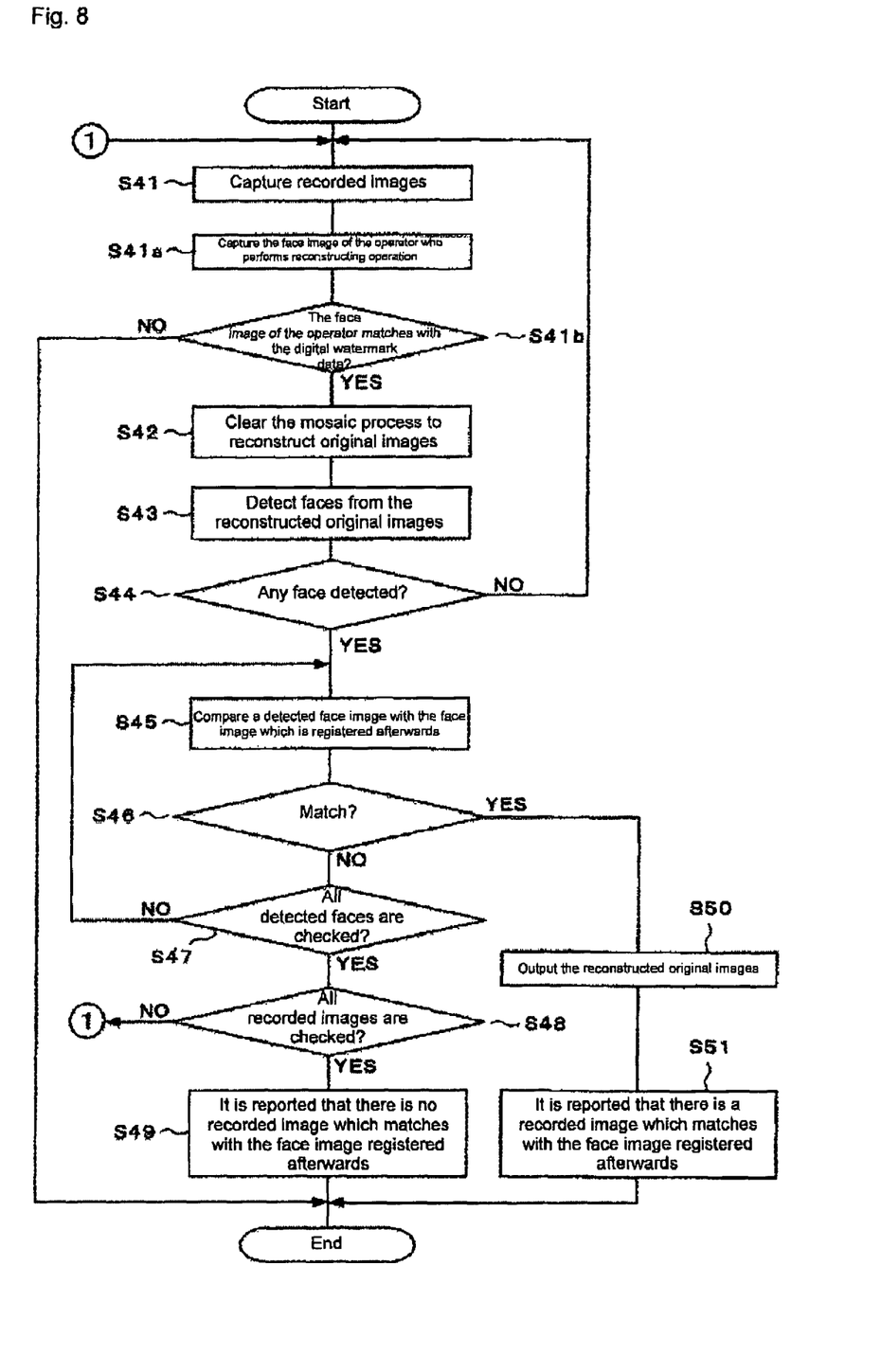
FIG. 8 shows a flowchart depicting the identification procedure in the case where a face image is registered afterwards in another embodiment.

In the comparison in the above-described case where a face image is registered afterwards, it is preferable in terms of security that the process for reconstructing original images by clearing the mosaic process applied to images stored in the storage device 5 can be done exclusively by an authorized person (e.g., system administrator). FIGS. 7 and 8 show flowcharts depicting the embodiment of this case.

FIG. 7 shows a flowchart corresponding to the flowchart shown in FIG. 3, so the same steps as those in FIG. 3 are referred to with the same symbols. The procedure in Steps S11 to S19 is the same as in FIG. 3, so its explanation is omitted. When all faces have been checked in Step S19 (Step S19: YES), the face image of a recorder who records images is captured (Step S20a); the captured face image of the recorder is embedded as a "digital watermark" in the images processed in Steps S16 and S17; and the images with the "digital watermark" are stored in the storage device 5 (Step S20b). The term "recorder" used in this case can be a system administrator, and the face image of the recorder which is captured in Step S20a is previously taken by the scanner 6 or the digital camera 7 and stored in the storage device 5.

The following is a description on the procedure for reconstructing original images. FIG. 8 shows a flowchart corresponding to the flowchart of FIG. 6, so the same steps as those in FIG. 6 are referred to with the same symbols. First, images stored in the storage device 5 are captured in the computer 3 (Step S41). Next, the face image of the operator who performs a reconstructing operation of images is captured (Step S41a). The face image of this operator is taken by the scanner 6 or the digital camera 7 at this point in time. Then, it is determined whether the face image data captured in Step S41a matches with the data of "digital watermark" embedded in the images captured in Step S41 or not (Step S41b). If these pieces of data do not match with each other (Step S41b: NO), it is determined that the operator who is going to perform the reconstructing operation is not the above-mentioned recorder (system administrator), and the process is terminated. On the other hand, when these pieces of data match with each other (Step S41b: YES), it is determined that the operator and the recorder (system administrator) are the same person, and the mosaic process is cleared to reconstruct the original images (Step S42). Since the procedure from Step S42 onward is equal to the procedure in FIG. 6, the explanation will be omitted.

As described hereinbefore, using the face image of the recorder as a "digital watermark" makes it possible to authorize only the recorder to perform reconstruction and to prohibit an unauthorized third party from clearing a mosaic process to reconstruct original images, thereby securing the security.

The present invention can adopt various other embodiments besides the embodiment described above. For example, in the above embodiment, a mosaic process is taken as an example of the abstraction process to be applied to face images; however, it is also possible to apply a process to blur face image portions, instead of applying the mosaic process. Alternatively, face image portions can be filled in black or white, instead of being applied with the mosaic process or the blurring process.

In the above embodiment, images which are videotaped by the surveillance cameras 1 and applied with a mosaic process or a marker are stored in the storage device 5; however, the images can be merely displayed on the display monitor of the identification results output device 4. In this case, there is no need for storage to the storage device 5.

Figure 9:
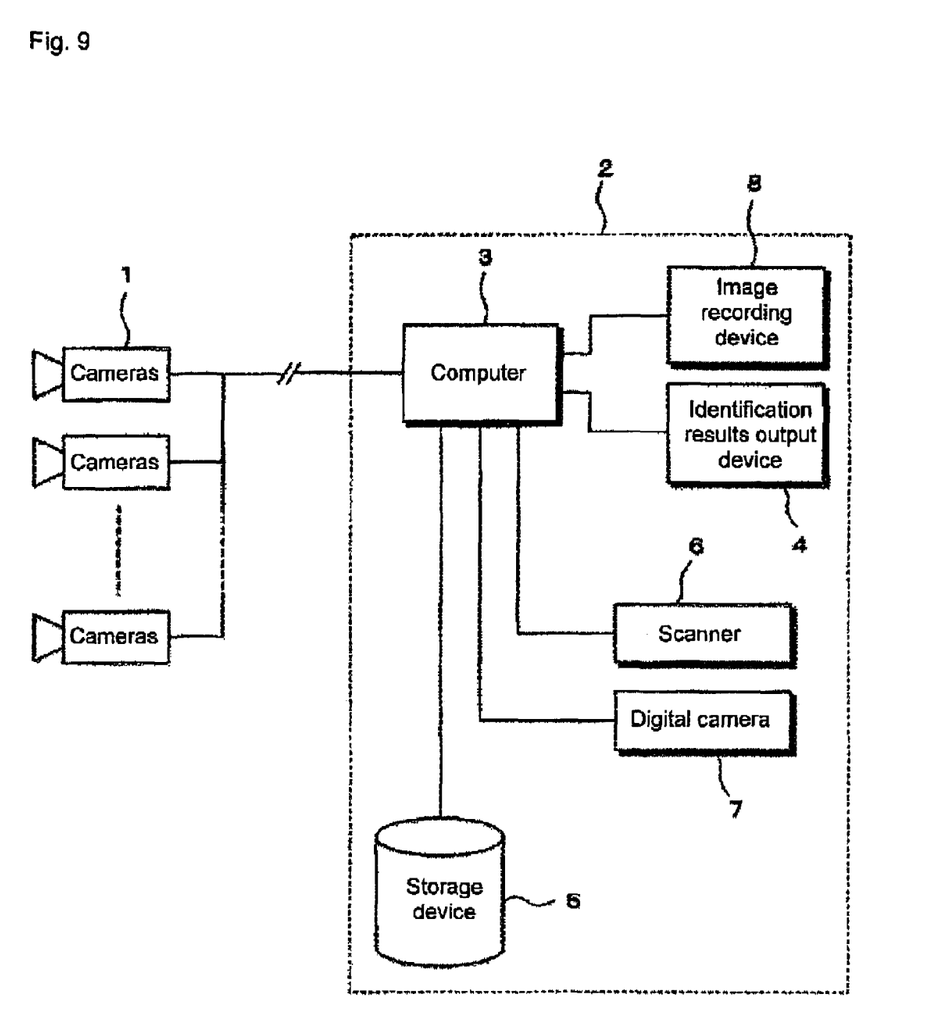
FIG. 9 shows a block diagram showing another embodiment of the present invention.

In the above embodiment, face images which are registered either previously or afterwards are stored in the storage device 5, and images which are videotaped by the surveillance cameras 1 and applied with a mosaic process or a marker are also stored in the same storage device 5. Alternatively, as shown in FIG. 9, a special image storage device 8 can be provided in addition to the storage device 5 so that face images to be registered can be stored in the storage device 5 whereas images videotaped by the surveillance cameras 1 can be stored in the image storage device 8. The image storage device 8 can be composed of any kind of device dealing with recording media such as a video tape recorder, a DVD (Digital Versatile Disk) recorder, or a hard disk recorder. In that case, faces other than the face of the specific person are applied with an abstraction process, so there is no fear of violating their rights of portrait or privacy during reproduction.

According to the present invention, an abstraction process is applied exclusively to the face images of the people other than a specific person, thereby protecting their rights of portrait or privacy, whereas the images for the dress and baggage of the specific person and the other people are kept as they are. This information can be used as a clue to facilitate the search for the specific person.

What is claimed is:

1. A face identification device comprising:
   detection means for detecting face images from original images taken by a camera;
   storage means in which a face image of a specific person is previously or subsequently stored;
   determination means for determining whether a face image detected by the detection means matches with the face image stored previously or subsequently in the storage means by comparing both face images; and
   abstraction process means for applying an abstraction process to a face image out of the face images detected by the detection means from the original images in order to make the face image unrecognizable,
   the abstraction process means applying the abstraction process exclusively to a detected face image when the determination means determines that the detected face image is not a specific person, and not applying the abstraction process to a detected face image when the determination means determines that the detected face image is a specific person, wherein
   the storage means stores the original image abstracted by the abstraction process means,
   when a new face image is stored in the storage means subsequently, the abstraction means restores to the original image abstracted by the abstraction process means in the storage means,
   the detection means detects face images from the restored original image, and
   the determination means determines whether a face image in the restored original image detected by the detection means matches with the new face image stored subsequently in the storage means by comparing both face images.

2. The face identification device according to claim 1, wherein said abstraction process is a mosaic process for making a face image portion mosaic.

3. The face identification device according to claim 1, wherein when said determination means determines that the detected face image is a specific person, a detected face image is not applied with the abstraction process and is applied with a marker.

4. The face identification device according to claim 1, wherein when a face image detected by said detection means is determined to match with the face image stored in said storage means, the image of the specific person which is not applied with the abstraction process on the face and remaining parts thereof and the images of people other than the specific person which are applied with the abstraction process exclusively on the faces thereof are displayed, and a warning is also outputted.

5. A face identification method comprising the steps of:
   detecting face images from original images taken by a camera;
   determining whether a detected face image matches with a previously or subsequently stored face image of a specific person by comparing both face images;

applying an abstraction process exclusively to a detected face image in order to make the detected face image unrecognizable, when it is determined that the detected face image is not a specific person;

not applying the abstraction process to the detected face image when it is determined that the detected face image is a specific person;

when a new face image is stored subsequently, restoring the original images taken by the camera;

detecting face images from the restored original images; and determining whether a face image from the restored original images matches with the new face image stored subsequently by comparing both face images.

6. A face identification system comprising:

at least one video camera for acquiring images of people; and a face identification device for comparing said acquired images with images of specific people previously or subsequently stored in said face identification device to determine whether at least one of said acquired images matches at least one of said stored images of specific people, if said face identification device determines that said match does not exist, changing said at least one of said acquired images to make said at least one of said acquired images unrecognizable, subsequently storing additional new images of specific people in said face identification device, changing said at least one of said acquired images to make said at least one of said acquired images recognizable again, and comparing said recognizable again image with said additional new images of specific people subsequently stored in said face identification device.

7. A face identification system comprising:

a computer;

image input circuitry that provides input images to the computer; and previously or subsequently stored face image data for a set of at least one registered face of a specific person, the computer executing a procedure that includes:

detecting a set of faces in an input image;

for each face in the set of detected faces, comparing it with the previously or subsequently stored face image data;

if the face does not match any of the set of registered faces of specific people, making the face unrecognizable in a version of the input image;

after another new face image is subsequently stored, making the face recognizable again; and comparing the another new face image subsequently stored with the recognizable again face image.

8. The system of claim 7 in which the computer makes the face unrecognizable by applying a mosaic process.

9. The system of claim 7 in which the procedure further includes storing the version of the input image.

10. The system of claim 7 in which the input circuitry includes a digital camera.

11. The system of claim 7 in which the input circuitry includes a scanner.

12. A face identification system comprising:

a computer;

stored image version data for a version of an original image in which a face in the original image has been made unrecognizable; and stored face image data for a registered face;

said computer executing a procedure that includes:

using the stored image version data to reconstruct the original image;

detecting a set of faces in the reconstructed original image; and for each face in the set of detected faces in the reconstructed original image, comparing the face with new face image data and if the face matches the new face image data, providing an indication of a match, wherein the stored face image data for a registered face is stored after the face in the original image has been made unrecognizable.

13. A face image detection method comprising:

detecting a set of faces in an input image;

for each face in the set of detected faces, comparing it with previously stored face image data and if the face does not match any of the set of stored image face data, making the face unrecognizable in a version of the input image, and if the face matches any of the set of stored image face data, making the face recognizable in a version of the input image; and for each face in the set of recognizable detected faces, comparing it with subsequently stored new face image data.

14. A face image detection method comprising:

reconstructing an original image using stored image version data, the stored image version data being for a version of the original image in which a face in the original image has been made unrecognizable;

detecting a set of faces in the reconstructed original image; and for each face in the set of detected faces in the reconstructed original image, comparing it with subsequently stored new face image data and if the new face matches a registered face, providing an indication of a match, wherein the stored face image data is stored after the face in the original image has been made unrecognizable.

15. A face image detection method comprising:

detecting a set of faces in an input image, comparing each face in the set of detected faces with previously stored face image data;

if a face does not match any of the previously stored image face data, applying a mosaic process to make the face unrecognizable in a version of the image;

if the face matches previously stored image face data, applying a marker to the face in the version of the image and providing a name of the matching stored image face data; and storing the version of the image;

when new face image data is stored subsequently, reversing the mosaic process to make the face recognizable again; and comparing the recognizable again face to the new face image data to determine whether there is a match.

* * * * *